2,893,166

STABILIZED SOIL AND METHOD OF PRODUCING IT WITH QUATERNARY NITROGEN SALT

George R. Bauwin, Collinsville, Ill., and Frank X. Grossi, St. Louis, Mo., assignors to Union Starch & Refining Company, Columbus, Ind., a corporation of Indiana No Drawing. Application September 9, 1954
Serial No. 455,076

5 Claims. (Cl. 47—1)

This invention relates to a process of conditioning soils especially those which have poor structure.

Among the objects of the invention is to provide a composition and a method for quickly improving the structure of soils.

Among other objects of the invention is to provide a method of increasing crop yields, of reducing erosion in soils, and of stabilizing exposed soil surfaces which are vulnerable to erosion until cover crops can be established.

Three important factors in the productivity of a soil are climate, physical condition of the soil, and the chemical fertility of the soil.

Among still further objects of the invention is to provide a method for improving the physical condition of a soil without detrimentally affecting the chemical fertility thereof.

Good soil structure is important because it makes it possible (1) for air and water to move into and through the soil; (2) for the soil to hold enough water in a form available for plants to use; and (3) for the plant roots to pass through and make use of the soil. It governs the size and distribution of soil pores which in turn govern the movement of air and water. Soils of good structure have a desirable range of pore sizes that (1) permit water to infiltrate readily and spread rapidly through the rooting zone; (2) allow excess water to be removed quickly from the soil; and (3) permit the exchange of gases (especially carbon dioxide and oxygen) through the pores.

Soils of good structure do not become water-logged readily during periods of high rainfall. As a result, oxygen necessary for growth and the proper functioning of plants is not a limiting growth factor.

Soils of good structure are not readily subject to shrinkage. Shrinkage results in compaction, especially in the form of soil crusts, and the formation of cracks and fissures. Compaction is undesirable in that normal plant growth is retarded, due to unfavorable growing conditions, and because excessive capillary action results in rapid loss of soil moisture through surface evaporation. Cracks and fissures are undesirable because they increase the rate of transfer of soil moisture to the atmosphere.

Aggregates found in soils which do not contain an optimum amount of organic matter in the proper state of decomposition or other soil conditioning agents, when saturated with water are very unstable. This lowered stability together with the impact exerted on soil by raindrops, causes considerable destruction of aggregates in the surface soil. The dispersed soil particles will clog soil pores and prevent infiltration and percolation of water and exchange of gases. Upon drying, this dispersed surface layer of soil may form a compact crust that makes it difficult for air and water to enter the soil and results in poor germination of seeds. When moist, this "puddled" layer will not admit water readily and excess moisture will either flow across the surface of the soil or will be channelized. In either case, large quantities of valuable soil will be lost through erosion.

One phase of this invention is based on the discovery that 0.01% and greater by weight of certain quaternary ammonium salts improves the physical condition of the soil or the soil structure to a remarkable extent. Although there is no practical upper limit to the amount of such conditioner than can be added, 0.1% appears to produce good results in even the poorest soils.

The quaternary ammonium salts employed are salts of the following structural formula

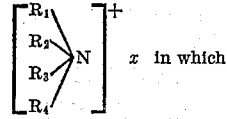   $x$ in which $x$ is an anion, $R_1$ is a hydrocarbon radical containing 6–22 or more carbon atoms and $R_2$, $R_3$, $R_4$ are selected from the group consisting of hydrogen, alkyl, aryl and alkyl aryl radicals. Very good results were obtained with quaternary ammonium salts in which two or more radicals $R_1$ and $R_2$ for example, contain 6–22 or more carbon atoms. Two or more of the substituents $R_3$ and $R_4$, for example, may be united to form a pyridinium, morpholinium, quinolinium, piperidinium, isoquinolinium, or nicotinium radical. Theoretically a bactericide would be the worst of all possible soil conditioners. Evidence indicates that this unexpected inactivity is due to the neutralization of the cationic or surface activity of the salt by reaction with the colloidal complex of soils.

Still another phase of the invention is based on the discovery that, compared with other synthetic soil conditioners of the anionic polyelectrolyte type, the quaternary ammonium salts are easier to apply to the soils. The anionic polyelectrolytes are electronegative and may be inactive and/or precipitated by small quantities of soluble polyvalent salts of $Al^{+++}$, $Fe^{+++}$, $Mn^{++}$, $Zn^{++}$, etc. found in soils. Also, it is possible that the plants growing in the soil may be deprived of certain indispensable trace elements by such reaction with the anionic polyelectrolytes.

Examples of the quaternary ammonium salts which can be employed, include hexadecyl, octadecyl, dimethyl ammonium chloride; octadecenyl, hexadecyl dimethyl, ammonium chloride; octadecyl, trimethyl, ammonium chloride; dihexadecyl dimethyl, ammonium chloride; dioctadecyl dimethyl, ammonium chloride; octadecyl pyridinium chloride; octadecyl methyl morpholinium chloride; octadecyl quinolinium chloride; dilauryl piperidinium chloride; octadecyl nicotinium chloride; octadecyl isoquinolinium halide and mixtures thereof.

The soil conditioner of the invention is very satisfactory when applied as a composition comprising one percent or more of the conditioner and an extender which is relatively inert. Suitable extenders include sawdust, tailings and spent carbon from the corn wet milling industry, talc, clays, inorganic pigments, dry powdered corn starch, various fibers, etc. The mixture should pass through a 150 mesh scren. The conditioner may also be applied alone or as an aqueous solution, by spraying for example. Since the quaternary ammonium salts are surface active they have the advantage (over the high polymer type of soil conditioner) in that they readily penetrate into the soil.

The invention both as to its organization and its method of operation together with additional objects and advantages thereof will best be understood from the following description of specific embodiments thereof.

EXAMPLE 1

To a first area of a soil, known as Putnam silt loam surface soil there was mixed about 0.05% of octadecyl dimethyl ammonium chloride which had previously been mixed with an inert extender comprising spent carbon from the corn wet milling industry. To other areas anionic polyelectrolyte soil conditioners or no soil conditioner was added. Philodendron plants and rubber plants were transplanted to such soils. After several weeks the plants grown in the first area had a healthy appearance and compared favorably with plants in areas containing other soil conditioners. The treated soil also contained molds indicating that the quaternary salt additive had no detrimental effect on all soil microorganisms. Pea seeds planted in the soil of the first area germinated normally. These preliminary tests and many others have demonstrated the desirable effect of the additions on soil.

The following examples are of experiments designed to establish reasons for the beneficial action of such compounds on soils.

EXAMPLE 2

This example compares the ability of dioctadecyl dimethyl ammonium chloride (QI) to form stabilized agglomerates, with that of (1) a polymer which is a high viscosity sodium carboxymethyl cellulose (CMC-120), (2) the copolymer known as vinyl acetate maleic anhydride (VAMA), also (3) the quaternary ammonium salt added in spent carbon as an extender (5% of QI) was tested.

In all of the tests 100 grams of Putnam silt loam surface and subsurface soil was pulverized to pass a 0.25 mm. sieve. To this soil the polymer or quaternary ammonium salt is added and 30 ml. of distilled water is added. After thorough mixing the soil was pressed through approximately the same sized area of a 4 mm. sieve. The resultant crumbs were air dried for at least two days. 40-gram samples were then placed on a 0.25 mm. sieve which had originally passed the particles thereof. The sieve was lowered into a water bath to a point where the soil just began to wet from below and held there until the crumbs were completely wetted by capillarity. Then the sieve was lowered and raised in the water through a distance of 2 inches, 120 times. Thereafter, the sieve was removed from the bath, allowed to drain and the soil dried at 105° C. and weighed. This measured the percent of stable aggregates under conditions of the test which were greater than 0.25 mm. The following table gives the results obtained:

SURFACE SOIL

| Amount of Addition in Percent | QI | VAMA | CMC-120 | QI with spent carbon |
|---|---|---|---|---|
| 0.1 | 90.0 | 75.0 | 62.3 | 87.5 |
| 0.075 | 73.0 | 59.5 | 52.8 | 70.0 |
| 0.05 | 58.3 | 43.5 | 34.0 | 51.0 |
| 0.03 | 26.3 | 23.8 | 16.0 | |

SUBSURFACE SOIL

| | | | | |
|---|---|---|---|---|
| 0.1 | 97.3 | 48.0 | 26.5 | 95.0 |
| 0.075 | 94.0 | 36.0 | 16.0 | 90.0 |
| 0.05 | 80.0 | 30.5 | 11.5 | 77.5 |
| 0.03 | 73.8 | 13.5 | | |

Comparable results were obtained when additional amounts of distilled water were added to the samples.

EXAMPLE 3

It was noted during the progress of the experiments with growing plants that soil treated with the quaternary ammonium compounds of the invention and reworked lost almost none of its desirable aggregate stability whereas it is known that most soil conditioners of the polymeric type of polyelectrolytes have to be replaced or supplemented after reworking the soil or the soil has to be treated with excess OH-ions or phosphate ions. The following tests show how the reworking affects the soil containing the conditioners. This is a laboratory procedure for simulating over-tillage of soils; and indication of the mechanical breakdown of said aggregates.

Soils containing 0.1% of QI and 0.1% of VAMA were each divided into 3 portions. The first portion of each sample was treated as in Example 2. The second portion was pulverized, mixed with 30 ml. water, aggregated by passing through a 4 mm. sieve and air dried as before but instead of wet sieving the product was repulverized, mixed with water, aggregated and air dried a second time before wet sieving. In the third sample the pulverizing, etc., steps were carried out a total of 3 times. The following table shows the results.

| Number of times reworked | QI | VAMA |
|---|---|---|
| 0 | 90.0 | 75.0 |
| 1 | 92.0 | 15.5 |
| 2 | 91.3 | 5.3 |

EXAMPLE 4

Although it was known from Example 1 that the quaternary ammonium salts do not prevent the growth of all soil microorganisms the following tests were run to determine the effect on the processes of ammonification and nitrification. To the 100 gram samples of Putnam silt loam surface soil, pulverized to pass a 0.25 mm. sieve, was added 0.3 gram of calcium carbonate, 0.25 gram of finely-ground alfalfa, and the appropriate amount of conditioner. Thirty ml. of distilled water was then added. The soil and additives were well mixed and pressed through approximately the same sized area of a 4-mm. sieve. The soil crumbs were allowed to air-dry at least two days. Fifty-gram samples were placed in 500 ml. Erlenmeyer flasks and incubated at an optimum temperature and moisture level for 25 days. Nitrate-nitrogen was then extracted with 100 ml. of a 10 percent solution of acetic acid and the concentration determined by using a colorimetric procedure which was based upon the formation of a pink dye through the interaction of nitrous acid (produced by the reduction of nitrates with zinc) with alpha-napthylamine and sulfanilic acid in an acid medium. The results are as follows:

| Percent QI in soil | Concentration of $NO^3$—(p.p.m.) |
|---|---|
| None | 374 |
| 0.1 | 376 |
| 0.075 | 378 |
| 0.05 | 374 |

Samples without the addition of organic-nitrogen, such as alfalfa, after a similar incubation period, contain a very low concentration of nitrate nitrogen.

Examples 2–4 above attempt to measure in a quantitive way the effects of the soil conditioner of the invention. These same results were noted in a qualitative way in actual growth experiments on outside soils. The qualitative observations may be summarized as follows:

The incorporation of the specified quaternary ammonium compounds in concentrations ranging from 0.01% and greater based on the weight of dry soil will result in noticeable increases in the percentage of water stable aggregates exceeding in diameter 0.25 mm. This results in increased non-capillary pore space, rapid percolation of rainwater to the sub-soil, and improved water holding capacity. A discontinuous soil structure means a more gradual release of moisture to vegetation. Treated soils do not slake down or puddle after a heavy rainfall, thus minimizing erosion. The rapid drainage to the subsoil results in quicker drying out and affords the farmer an earlier opportunity to work the soil.

Soils treated with the prescribed nitrogen compounds do not compact, crust or form cracks. There is no alternate expansion and contraction as with soils treated with the anionic polyelectrolytes.

The moisture level of the soil to be treated is not as critical with the quaternary ammonium compounds as with the polyelectrolytes.

Alternate freezing and thawing have shown no reduction in the efficacy as soil aggregants of the above mentioned quaternary ammonium compounds.

The most striking difference in the behavior of the cationic electrolyte type of soil aggregant and the anionic polyelectrolyte type is in the re-workability or re-aggregation of treated soils.

The features and principles underlying the invention described above in connection with specific exemplifications will suggest to those skilled in the art many other modifications thereof. It is accordingly desired that the appended claims shall not be limited to any specific feature or details thereof.

We claim:
1. As a soil conditioning material, a composition consisting essentially of spent carbon and at least 1% by weight of a quaternary nitrogen salt having at least one substituent group directly attached to the quaternary nitrogen which group contains 6–22 carbon atoms in a straight chain.

2. A soil conditioning composition as claimed in claim 1 in which the quaternary nitrogen salt is a quaternary ammonium salt including two substituent groups directly attached to nitrogen each of which substituent groups contains 6–22 carbon atoms in a straight chain.

3. A method of treating a silt loam type of soil having poor physical structure, to produce therefrom a stabilized agricultural surface soil having improved structure adapted to permit water to infiltrate readily therein, allow excess water to be removed quickly therefrom and permit exchange of gases through the pores thereof comprising the step of dispersing therein about 0.01% to about 0.1% based on the weight of the surface soil of a quaternary nitrogen salt having at least one substituent group directly attached to the quaternary nitrogen which group contains 6–22 carbon atoms in a straight chain.

4. The method as claimed in claim 3 in which the quaternary ammonium salt contains two substituent groups directly attached to the quaternary nitrogen each of which two groups contains 6–22 carbon atoms in a straight chain.

5. A stabilized surface soil having improved structure adapted to permit water to infiltrate readily therein, allow excess water to be removed quickly therefrom and permit exchange of gases through the pores thereof comprising dispersed therein about 0.01% to about 0.1% based on the weight of the surface soil of a quaternary nitrogen salt having directly attached to the quaternary nitrogen two substituent groups each of which contains 6–22 carbon atoms in a straight chain.

References Cited in the file of this patent

UNITED STATES PATENTS

| | | |
|---|---|---|
| 2,014,609 | Barnhill | Sept. 17, 1935 |
| 2,392,518 | Barnhill | Jan. 8, 1946 |
| 2,599,127 | Resuggan | June 3, 1952 |
| 2,614,917 | Zukel et al. | Oct. 21, 1952 |
| 2,751,713 | Abramitis | June 26, 1956 |
| 2,807,910 | Erickson | Oct. 1, 1957 |
| 2,831,779 | Erickson | Apr. 22, 1958 |

OTHER REFERENCES

"Manual on Fertilizer Manufacture" (Sauchelli), published 1946 by Davison Chem. Co., Baltimore. Only page 95 is relied on.

Clare: "Effect of Cetyl Pyridinium Bromide on—Soil," published Dec. 13, 1957 in Nature (magazine) at London, England, vol. 160, No. 4076, pages 828 and 829.

Everson: "Effects of Carbon Black on—Soils," published May, 1950 in Soil Science (magazine), vol. 69, No. 5, pages 369 through 376.

Marth et al.: "Growth-Controlling Effects of some Quaternary Ammonium Compounds on Various Species of Plants," published December, 1953 in Botanical Gazette, vol. 115, No. 2, pages 200 through 204.

Owen: "Dewaxed Retreated—Press Mud as a Plant Food," published March 1954 in Sugar (magazine), vol. 49, No. 3, pages 40, 41, 42.